(12) United States Patent
Wishart

(10) Patent No.: US 9,465,115 B2
(45) Date of Patent: Oct. 11, 2016

(54) PROCESSING OF SIGNALS TO PROVIDE A DELAY DOPPLER MAP

(71) Applicant: ASTRIUM LIMITED, Stevenage (GB)

(72) Inventor: Alexander Walker Wishart, Stevenage (GB)

(73) Assignee: AIRBUS DEFENCE AND SPACE LIMITED, Hertfordshire (GB)

( * ) Notice: Subject to any disclaimer, the term of this patent is extended or adjusted under 35 U.S.C. 154(b) by 359 days.

(21) Appl. No.: 13/918,618

(22) Filed: Jun. 14, 2013

(65) Prior Publication Data

US 2013/0335265 A1 Dec. 19, 2013

(30) Foreign Application Priority Data

Jun. 15, 2012 (EP) .................................... 12275093

(51) Int. Cl.
*G01S 19/42* (2010.01)
*G01S 19/14* (2010.01)
*G01S 19/37* (2010.01)
*G01S 13/00* (2006.01)
*G01S 13/95* (2006.01)

(52) U.S. Cl.
CPC ............. *G01S 19/42* (2013.01); *G01S 13/003* (2013.01); *G01S 13/955* (2013.01); *G01S 19/14* (2013.01); *G01S 19/37* (2013.01)

(58) Field of Classification Search
CPC .... G01S 13/003; G01S 13/955; G01S 19/14; G01S 19/37; G01S 19/42
USPC .......................................................... 342/25
See application file for complete search history.

(56) References Cited

U.S. PATENT DOCUMENTS

2012/0020527 A1* 1/2012 Abileah ............... G06K 9/0063
382/106

OTHER PUBLICATIONS

Charles M. Rader, "An Improved Algorithm for High Speed Autocorrelation with Applications to Spectral Estimation," IEEE Transactions on Audio and Electroacoustics, vol. AU-18, No. 4, Dec. 1970.

* cited by examiner

*Primary Examiner* — Timothy A Brainard
(74) *Attorney, Agent, or Firm* — Buchanan Ingersoll & Rooney PC

(57) ABSTRACT

An apparatus is disclosed for processing a sequence of samples of a received signal R reflected by a target surface and having a delay and a frequency shift relative to a reference signal D to obtain a delay Doppler map for the reflected signal. A first correlation module can obtain partial correlations z(n', k) between samples corresponding to the reflected signal R and a samples corresponding to the reference signal D, across a set of delays. An inverse discrete fourier transform (DFT) of a sequence of samples can be derived from at least DFTs of a first reflected signal sequence and second reference signal sequence.

20 Claims, 6 Drawing Sheets

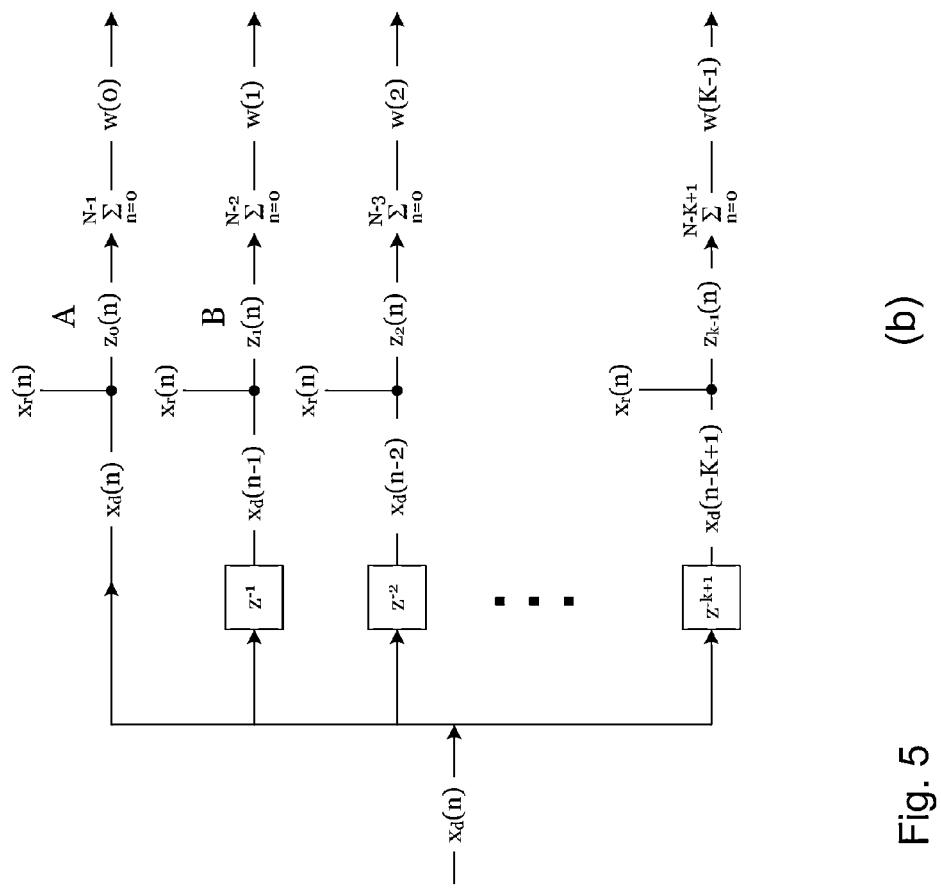
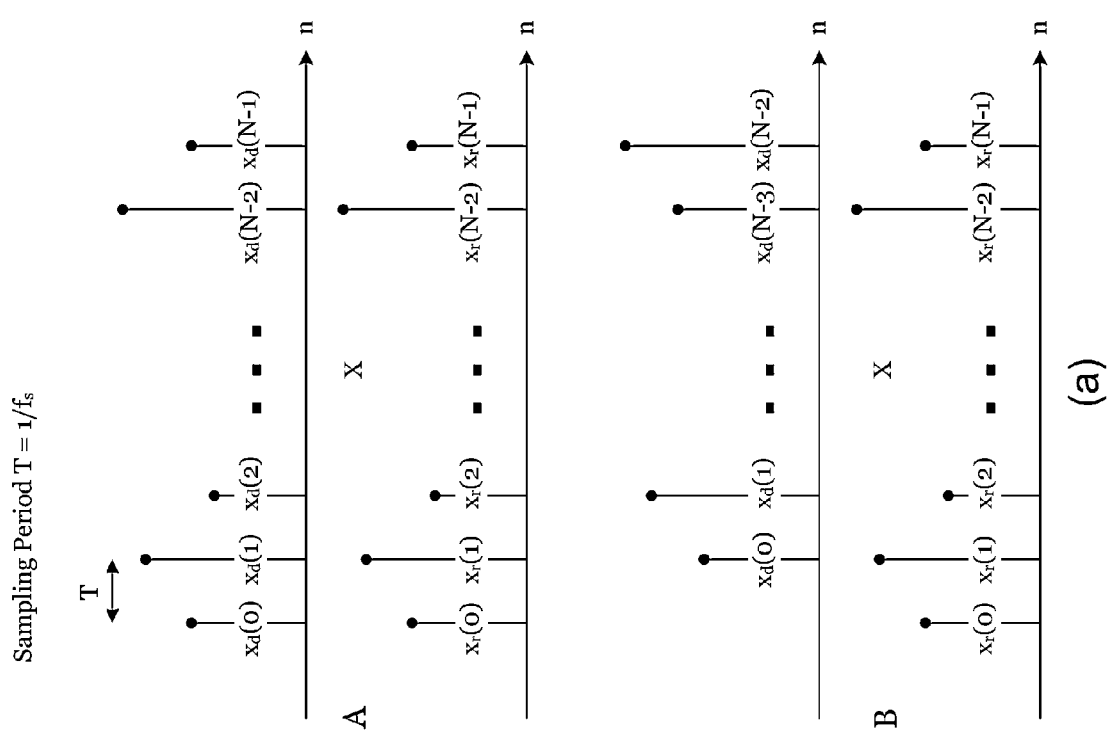
Fig. 5

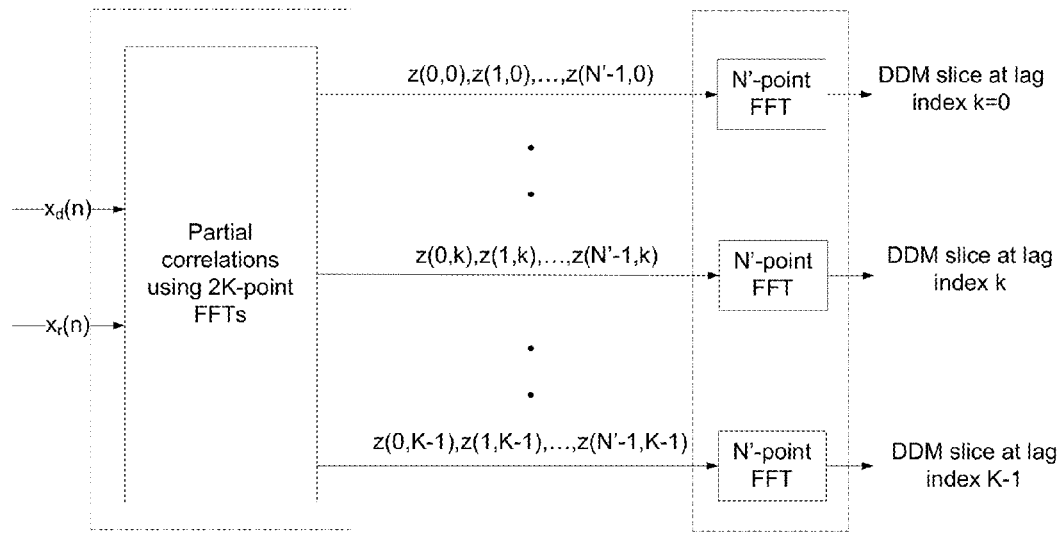
Fig. 7
Fig. 8
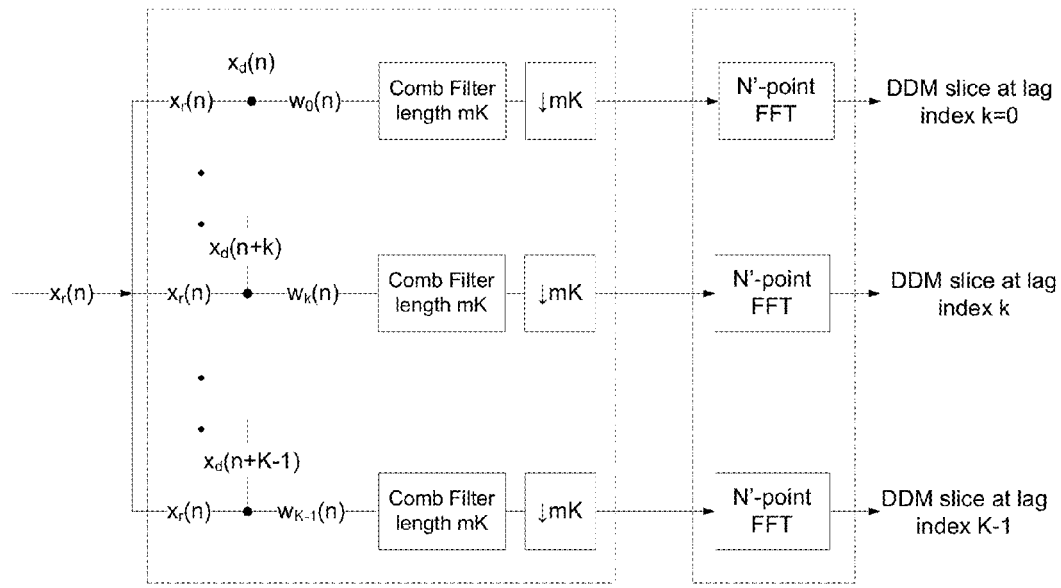

PROCESSING OF SIGNALS TO PROVIDE A DELAY DOPPLER MAP

FIELD OF THE INVENTION

The invention relates to the processing of signals to provide a delay Doppler map. More particularly, but not exclusively, it relates to the correlation, in a reflectometry system, of a received signal which has been reflected off a surface with a reference signal corresponding to the transmitted signal to provide a delay Doppler map.

BACKGROUND OF THE INVENTION

Reflectometry is the term given to the measurement technique where a transmitted signal waveform is directed at a surface and the reflected signal is then correlated with a copy of the transmitted signal to yield information about the characteristics of the reflecting surface.

Global Navigation Satellite System reflectometry (GNSS-R) uses a satellite in a low earth orbit to capture Global Navigation Satellite System (GNSS) signals reflected from the earth and to correlate each of these signals with either a locally generated replica of the transmitted signal or with the transmitted signal itself which has been received directly from the GNSS satellite.

In more detail, by correlating the received signal with a signal received directly from the GNSS satellite, the path difference between the paths traveled by the reflected and the direct signal can be determined. The correlation effectively involves sliding the transmitted waveform across the received waveform, one sample at a time, and at each position multiplying the signals, sample by sample, before adding the products to form a correlation sample. The position at which the correlation peak is found corresponds to the relative delay between the signals and therefore the path difference. Since the orbits of the two satellites are known, the path difference can be used to determine the height of the reflecting surface.

For example, GNSS-R can be used for oceanographic applications to map the sea surface and determine the height of the surface of the sea over time. The altitude of the satellite with respect to the standard earth World Geodetic System (WGS) ellipsoid is known from the orbit of the satellite and the reflectometry measurements give the height above the sea level. The difference between the altitude of the satellite with respect to the WGS ellipsoid and the height above the sea level corresponds to the sum of the sea height and the local geo potential height. The geopotential is not known with sufficient accuracy to compute the sea height above the geopotential but it is assumed to be fixed so differences in measurements taken over time can be attributed to changes in the sea height.

In many applications it also desired to determine the Doppler spreading of the reflected signal. The Doppler spread is the difference in Doppler shift between different components of the reflected signal. Accordingly, it is sometimes desirable to compute a delay Doppler map (DDM), which is a 3D surface of the received energy as a function of delay and Doppler shift.

It is known to use discrete fourier transforms (DFT) and inverse discrete fourier transforms (IDFT) to correlate two signals. It is also known that fast fourier transforms (FFT) are efficient algorithms for computing the discrete fourier transform and its inverse. However, FFTs are impractical to implement when the number of samples in a signal to be transformed is large. For example, in a GNSS-R system for an oceanographic application, the number of samples in the sampled reflected signal may be 100,000, which makes FFTs difficult to implement.

One conventional approach for computing a delay Doppler map is to frequency shift a copy of the direct signal by an amount corresponding to a possible Doppler frequency and then to correlate the reflected signal with the frequency shifted copy of the direct signal for a set of delays to give one DDM slice along the delay axis. This can then be repeated for each frequency shift of interest. The approach is most efficient if the number of delay lags K is much larger than the number of frequency shifts L in the DDM and an efficient FFT based technique is used to compute the delay lags Another approach is to multiply each sample of the reflected signal with its corresponding delayed sample of a delayed copy of the direct signal and then to carry out an FFT on each lag sequence to compute the complete set of Doppler frequencies L for a specific delay. This can then be repeated for each delay. This approach is most efficient if the number of frequency shifts L of interest is much larger than the number of delay lags K. A problem with this approach is that an FFT may be impractical if the number of samples in each lag sequence is very large. Comb filters with output decimation have therefore been used to reduce the number of samples in each lag sequence.

In "An Improved Algorithm for High Speed Autocorrelation with Applications to Spectral Estimation, C. Rader, IEEE Transactions on Audio and Electroacoustics, Vol. AU-18, No. 4, December 1970, it is disclosed an FFT algorithm which involves using J-point cross correlations to correlate two sequences of length N, where J<<N.

The invention was made in this context.

SUMMARY OF THE INVENTION

According to the invention, there is provided a method of processing a reflected signal having a delay and a frequency shift relative to a reference signal to obtain a delay Doppler map, the method comprising: receiving a sequence of samples corresponding to said reflected signal and a sequence of samples corresponding to said reference signal; obtaining a plurality of partial correlations between the sequence of samples corresponding to the reflected signal and the sequence of samples corresponding to the reference signal, across a set of delays, to provide a set of partial correlation samples for each delay, each partial correlation sample of a set corresponding to a different partial correlation for that delay, wherein obtaining a number of partial correlations of said plurality of partial correlations, providing one partial correlation sample for each delay, comprises obtaining discrete fourier transforms DFTs of at least a first and an associated second sequence of samples, the first sequence comprising at least one subsequence of the reflected signal and the second sequence comprising at least one associated subsequence of the reference signal, and obtaining an inverse DFT of a sequence of samples derived from at least a product of said transforms of the first and second sequences; and obtaining a DFT of each set of partial correlation samples to determine the correlation between the sequences of samples across a plurality of frequency shifts at each delay of the set of delays.

Each of the sequences of samples of the reflected and the direct signal may comprise N samples where N is sufficiently large for an N-point FFT to be impractical. However, each of the first and second sequence may only comprise 2K samples where K is much smaller than N and the partial correlations can therefore be obtained using FFTs. Moreover, the number N' of partial correlation samples in each set is also much smaller than N and an FFT algorithm can also be used to compute the transform of each set. Accordingly, the invention allows the DDM to be computed using FFT algorithms in both dimensions.

The first and second sequence could comprise more than 2K samples. For example, each of the first and second sequences may comprise bK samples where $2 \leq b \leq 4$. The same transform size would be used for both the first and the second sequence.

Obtaining a number of partial correlations may further comprise storing a sample of said inverse DFT of said sequence of samples, derived from at least a product of said transforms of the first and second sequences, in each of said sets. Only the first K samples of the inverse DFT are useful. The other samples are discarded. The first K samples provide one partial correlation sample for each delay.

Each set of partial correlation samples may be stored as an array of samples.

Obtaining a number of partial correlations providing one partial correlation sample for each delay may further comprise multiplying each sample of the DFT of the first sequence with its corresponding sample of the DFT of the second sequence to form a product of the transforms. Moreover, obtaining an inverse DFT of a sequence of samples derived from at least a product of said transforms may comprise obtaining an inverse DFT directly on said product of the transforms.

Obtaining a number of partial correlations providing one partial correlation sample for each delay may comprise obtaining DFTs of each of a plurality of first sequences of samples, comprising said first sequence of samples, to provide a plurality of first transformed sequences, each of the plurality of first sequences of samples comprising the samples of at least one respective subsequence of the reflected signal, obtaining DFTs of each of a plurality of second sequences of samples, comprising said second sequence of samples, to obtain a plurality of second transformed sequences, each of the plurality of second sequences of samples comprising the samples of at least one respective associated subsequence of the reference signal, multiplying each sample of each of the first transformed sequences with its corresponding sample of an associated second transformed sequence to provide a plurality of transformed product sequences and summing the transformed product sequences to provide a summed product sequence. In this case, obtaining an inverse DFT of a sequence of samples derived from at least a product of said transforms may comprise obtaining the inverse DFT of the summed product sequence.

The plurality of first sequences may comprise at least two first sequences and the plurality of second sequences may comprise at least two second sequences.

The at least one subsequence of the reflected signal and the at least one subsequence of the reference signal may form part of a plurality of subsequences of K samples of the reflected signal and the reference signal respectively, wherein each partial correlation for a specific delay corresponds to a contiguous segment of the reflected signal, comprising one or more of the plurality of subsequences, and an associated contiguous segment of the reference signal, comprising one or more associated subsequences of the plurality of subsequences of the reference signal and wherein a subsequence of the plurality of subsequences of the sequence of samples corresponding to the reflected signal $x_r(n)$ comprises samples $x_r(n+iK)$ and a subsequence of the plurality of subsequences of the sequences of samples corresponding to the reference signal $x_d(n)$ comprises samples $x_d(n+iK)$, where $0 \leq n < K$ and $i=0, 1, 2 \ldots$. The subsequences may include a number of contiguous samples and the different subsequences may also be contiguous with respect to each other.

The or each of the first sequences of samples $x_r^i$ and the or each of the second sequences of samples $x_d^i$ may be formed by equations $$x_r^i = \begin{cases} x_r(n+iK), & 0 \leq n < K \\ 0 & K \leq n \leq 2K \end{cases} \quad i = 0, 1, 2, \ldots \text{ and}$$

$$x_d^i = x_d(n+iK), 0 \leq n < 2K \quad i = 0, 1, 2, \ldots \text{ respectively.}$$

or formed by equations $$x_r^i = x_r(n+iK), 0 \leq n < 2K \quad i = 0, 1, 2, \ldots \text{ and}$$

$$x_d^i = \begin{cases} x_d(n+iK), & 0 \leq n < K \\ 0 & K \leq n \leq 2K \end{cases} \quad i = 0, 1, 2, \ldots \text{ repectively,}$$

wherein the value of i for a first sequence is the same as the value of i for its associated second sequence.

The reflected signal may originate from a spacecraft operable to transmit a signal towards a surface, the reflected signal corresponding to the transmitted signal reflected off said surface, and the reference signal may be a copy of the transmitted signal received directly from the spacecraft or a locally generated copy of the transmitted signal.

According to the invention, there is also provided a computer program comprising instructions that when executed by a processor cause the processor to carry out the method set out above.

Moreover, according to the invention, there is also provided an apparatus for processing a sequence of samples of a received signal reflected by a target surface and having a delay and a frequency shift relative to a reference signal to obtain a delay Doppler map for the reflected signal, the apparatus comprising: a first correlation module for obtaining a plurality of partial correlations between the sequence of samples corresponding to the reflected signal and a sequence of samples corresponding to the reference signal, across a set of delays, the first correlation module being configured to obtain a number of partial correlation of said plurality of partial correlation, providing one partial correlation sample for each delay, by obtaining a DFT of at least a first sequence of samples and a DFT of at least a second sequence of samples, the first sequence comprising at least one subsequence of samples of the reflected signal and the second sequence comprising at least one associated subsequence of samples of the reference signal, and to obtain an inverse DFT of a sequence of samples derived from at least said DFTs of the first and second sequences; a memory for storing a plurality of sets of partial correlation samples, the samples of each set corresponding to the partial correlations for a different delay; and a second correlation module for obtaining a DFT of the samples in each set to determine the correlation between the sequences of samples of the reflected and the reference signals across a plurality of frequency shifts at each delay of the set of delays.

The first correlation module may be configured to obtain N' partial correlations for each delay and the second correlation module may be configured to use an N'-point FFT algorithm to obtain the DFT of the samples in each set.

The set of delays may comprise K delays, each of the first and the second sequences may comprise 2K samples and the first correlation module may be configured to use a 2K-point FFT algorithm to compute the DFTs of the first and the second sequences.

Each set of partial correlations may be stored as an array in the memory.

The first correlation module may comprise: one or more FFT modules for computing a 2K-point FFT of the first sequence and a 2K point FFT of the second sequence; a multiplier for multiplying the transformed first sequence with the transformed second sequence to obtain a transformed product sequence; and an inverse FFT module for obtaining a 2K-point inverse FFT of said transformed product sequence.

Alternatively, the first correlation module comprises: one or more FFT modules for computing 2K-point FFTs of each of a plurality of first sequences of samples, comprising said first sequence of samples, to provide a plurality of first transformed sequences and each of a plurality of second sequences of sample, comprising said second sequence of samples, to provide a plurality of second transformed sequences; a multiplier for multiplying each of the first transformed sequences with its associated second transformed sequence to provide a plurality of transformed product sequences; a summer for summing the transformed product sequences to derive said sequence of samples derived from at least said DFTs of the first and second sequences; and an inverse FFT module for computing a 2K-point inverse FFT of the derived sequence to obtain said number of partial correlations. Each of the plurality of first sequences of samples may comprise the samples of at least one respective subsequence of the reflected signal and each of the plurality of second sequences of samples may comprise the samples of at least one respective associated subsequence of the reference signal. The one or more FFT modules may successively compute the FFTs of the plurality of first sequences of samples and the FFTs of the plurality of second sequences of samples. Moreover, the multiplier may successively multiply the transforms and the summer may add the computed product sequences as they are computed.

The plurality of first sequences may comprise at least two first sequences and the plurality of second sequences may comprise at least two second sequences.

The first correlation module may be configured to form the or each of the first sequences of samples $x_r^i$ and the or each of the second sequences of samples $x_d^i$ according to equations $$x_r^i = \begin{cases} x_r(n+iK), & 0 \le n < K \\ 0 & K \le n \le 2K \end{cases} \quad i = 0, 1, 2, \ldots \text{ and}$$

$$x_d^i = x_d(n+iK), 0 \le n < 2K \quad i = 0, 1, 2, \ldots \text{ respectively,}$$

or according to equations $$x_r^i = x_r(n+iK), 0 \le n < 2K \quad i = 0, 1, 2, \ldots \text{ and}$$

$$x_d^i = \begin{cases} x_d(n+iK), & 0 \le n < K \\ 0 & K \le n \le 2K \end{cases} \quad i = 0, 1, 2, \ldots \text{ respectively,}$$

wherein the value of i for a first sequence is the same as the value of i for its associated second sequence.

The apparatus may further comprise a receiver for receiving a reflected signal and an analogue to digital converter for digitising the received signal into said sequence of samples corresponding to the reflected signal.

According to the invention, there is also provided a reflectometry satellite comprising the apparatus.

BRIEF DESCRIPTION OF THE DRAWINGS

Embodiments of the invention will now be described, by way of example, with reference to FIGS. 1 to 7 and 9 of the accompanying drawings, in which:

FIGS. 5a and 5b illustrate how the cross-correlation between a reflected signal and a reference signal, for a set of delays, can be computed;

FIG. 7 conceptually illustrates how the delay Doppler map can be computed using FFT algorithms in both delay and Doppler axes according to embodiments of the invention;

FIG. 8 conceptually illustrates how a Doppler map can be computed using a prior art approach providing a mathematically equivalent output to the conceptually approach illustrated in FIG. 7.

DETAILED DESCRIPTION

Figure 1:
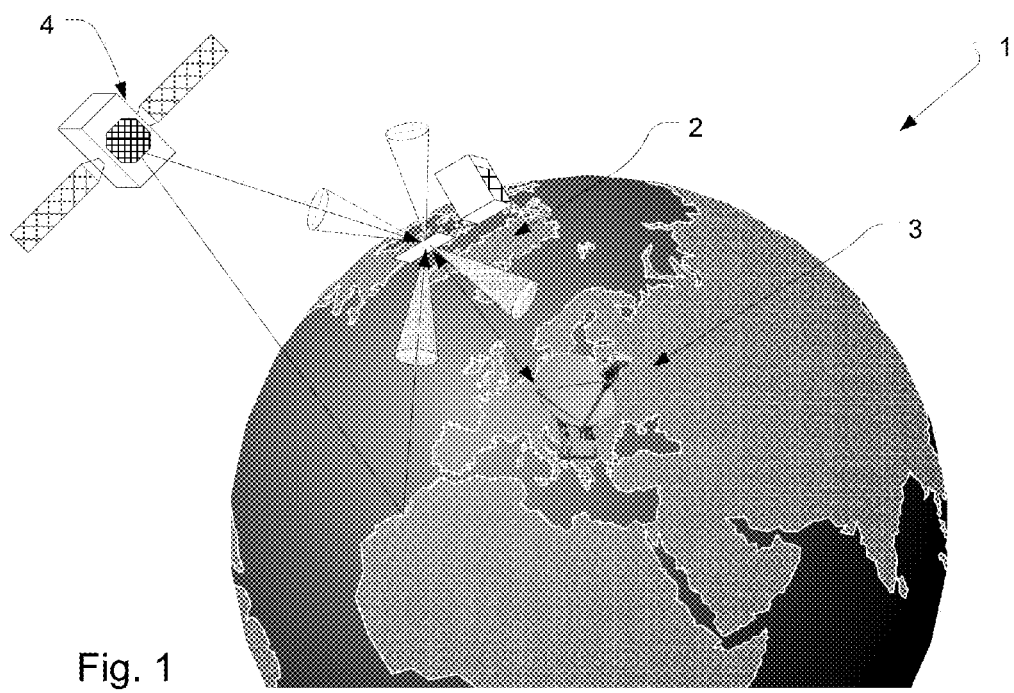
FIG. 1 shows a reflectometry system.

With reference to FIG. 1, a reflectometry system 1 is shown comprising a reflectometry satellite 2 in a low earth orbit (LEO) for receiving and processing radio frequency signals reflected from a target area and a ground station 3 for controlling the reflectometry satellite 2. In FIG. 1, the system also comprises another satellite 4 for transmitting the signals received and processed by the reflectometry satellite. The system of FIG. 1 may be a Global Navigation Satellite System Reflectometry (GNSS-R) system and the signals for characterising the target area may be GNSS signals generated and transmitted by a GNSS satellite. The reflectometry satellite 2 of FIG. 1 also receives, in addition to the signals reflected from the surface of the target area, a copy of the transmitted signal directly from the GNSS satellite 4. The direct signal provides a reference signal with respect to which the reflected signal is analysed. By comparing the direct copy and the reflected copy of the signal received in the reflectometry satellite 3 and generating a delay Doppler map (DDM), also referred to as the cross-ambiguity function (CAF), for the reflected signal, information about the target area can be determined.

As an alternative to the reflectometry satellite 2 receiving a copy of the signal directly from the GNSS satellite 4, a copy of the transmitted waveform can be generated locally where the DDM processing is carried out, provided that the characteristics of the transmitted signal are known. The GNSS waveform is a pseudo random noise (PRN) sequence and if the PRN code for the signal transmitted by the GNSS satellite 4 is available, a local replica of the signal can be generated. The advantages of comparing the reflected signal with a locally generated replica are, of course, that the locally generated replica is free from noise and that the additional complexity involved in tracking the GNSS satellite transmitting the signal can be avoided. The invention will be described with respect to a system in which a copy of the signal is received directly from the GNSS satellite 4 but it will be appreciated that the invention can also be implemented in a system in which the reference signal, with respect to which the reflected signal is analysed, is locally generated.

Moreover, the processing of the signals will be described to be carried out in an on-board processor of the reflectometry satellite 2 but it will be appreciated that the processing can be carried out in an alternative location, for example in the ground station 3 or in another location on ground. Additionally, it will be appreciated that although the invention will be described with respect to a GNSS-R system, the invention could be applicable to any system that computes DDMs. Instead of the reflected signal being received in a reflectometry satellite, the reflected signal may be received in another spacecraft, in an airborne platform or in a ground based installation and the DDM processing may be carried out where the signal is received or in a different location.

Figure 2:
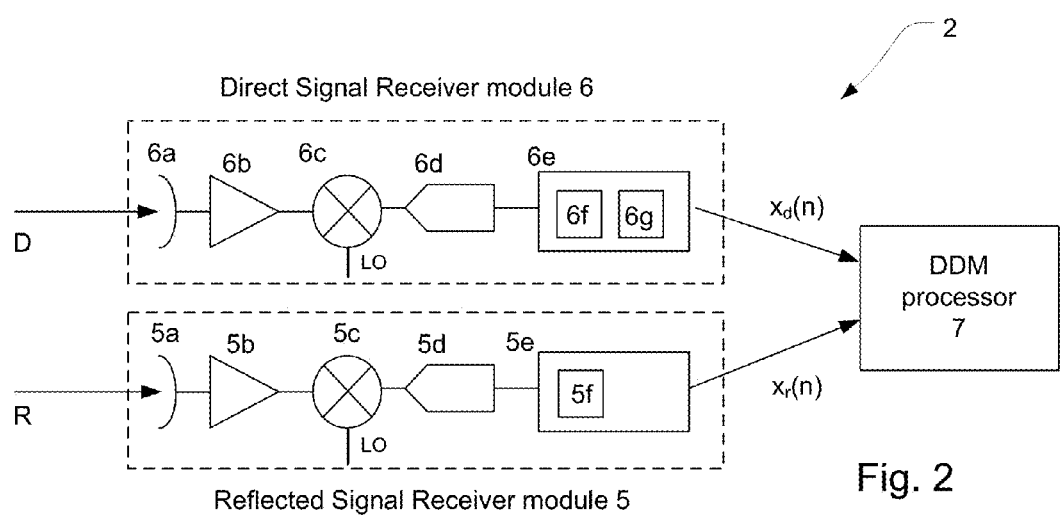
FIG. 2 illustrates the components of a payload of a reflectometry satellite.

With reference to FIG. 2, the payload of the reflectometry satellite comprises a first receiver module 5 for receiving and pre-processing a GNSS signal R from the GNSS satellite 4 which has been reflected by a surface of a target area. The system also comprises second receiver module 6 for receiving and pre-processing a copy of the GNSS signal D received directly from the GNSS satellite 4. However, it will be realised that if the reflected signal is compared to a locally generated copy of the transmitted signal, the direct signal receiver module 6 could be replaced by a module for locally generating a replica of the GNSS signal. The system also comprises a Delay Doppler Map (DDM) processor 7 for comparing the signals received in the first and the second receiver modules 5, 6. By determining the relative delay between the reflected signal and the direct signal, the system can determine the path difference between the signals. If the orbits of the satellites are known, the height of the surface from which the GNSS signal R have been reflected can then also be determined. By determining the Doppler spread of the signal, the system can further determine information about the motion of the target surface.

Figure 3:
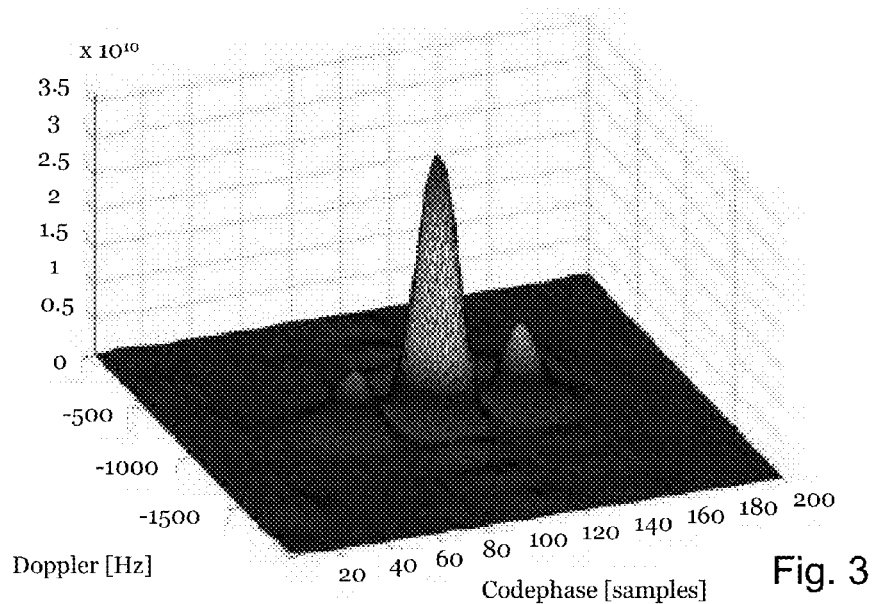
FIG. 3 shows an example of a delay Doppler map.

The DDM processor 7 is configured to compute a 3D surface of the received energy from a target area as a function of delay and Doppler shift. An example of a DDM is shown in FIG. 3. The delay Doppler map is a composite of all the reflected signals from points within a locus centred on the specular point and the spreading in time and frequency captured in the DDM is a measure of how much signal energy is being received from the reflecting facets in this area about this specular point. The DDM processor 7 will be described in more detail with respect to FIGS. 4 to 9.

The payload of the reflectometry satellite would also comprise a transceiver (not shown) for communicating with the ground station 3.

With reference to FIG. 2 again, the first receiver module 5 may comprise a first antenna 5a pointed at the GNSS satellite while the second receiver module 6 comprises a second antenna 6a pointing at a specular reflection point of interest on the surface of the earth. The first and second receiver modules also comprise low noise amplifiers (LNAs) 5b, 6b for amplifying the received signal, downconverters 5c, 6c for downconverting the received signals to baseband, analogue to digital converters (ADCs) 5d, 6d for sampling the signals and digital pre-processors 5e, 6e for digitally pre-processing the signals before they are provided to the DDM processor 7. Each downconverter may comprise a mixer which receives a signal from a local oscillator (not shown). The ADCs operate at sampling frequency $f_s$ appropriate for the bandwidth of the received signals. The sampling frequency would typically be chosen to satisfy the Nyquist criterion. For example, if the GNSS satellite 4 is a Galileo satellite transmitting an E5 signal of bandwidth 51 MHz, the sampling rate may be 102 Msps providing a sequence of 102000 samples when the integration period for the DDM is 1 ms. As an another example, if the GNSS satellite 4 is a GPS satellite transmitting an L1 signal of bandwidth 30 MHz, the sampling rate may be 60 Msps providing a sequence of 60,000 samples using an integration period for the DDM of 1 ms. The pre-processors 5e, 6e may comprise digital anti-aliasing filters (DAAF) 5f, 6f to convert the sampled real digital signals into complex envelope form.

The second receiver modules 6 would also comprise delay and frequency adjusters 6g for delaying and frequency shifting the direct signal to centre the reflection from a nominal specular point in the window of the correlation function provided by the DDM processor 7. In more detail, the reflected signal received at the satellite comprises the signals reflected from a number of points of a surface. The DDM processor will act as a filter which only accepts signals reflected from points within a locus centred on a specular point determined by the delay and Doppler matching of the direct signal. Signals reflected from points outside that locus are rejected. The specular reflection has a path delay and a Doppler shift relative to the direct signal or a locally generated replica. The replicas have slightly different path delays and Doppler shifts relative to the specularly reflected signal. The processing equipment can delay and frequency shift the direct signal, or the locally generated copy, to correlate it with the specular signal. In other words, the direct signal is delay and Doppler matched such that the reflected signal from the nominal specular point together with a large number of replica echoes from favourably oriented reflecting facets adjacent to the specular point are processed in the DDM processor 7.

The delay and frequency adjusters 6g may be provided either in the analogue or the digital domain of the second receiver module 6. If the delay and Doppler matching are carried out in the analogue domain, the delay may be provided using a delay line and the Doppler matching may be provided by mixing the signal with a tuneable mixer to change the carrier frequency. The delay and Doppler matching in the analogue domain may be implemented in hardware. If the delay and Doppler matching is carried out in the digital domain, as shown in FIG. 2, the delay matching may be implemented by buffering the samples using read/write memory and the Doppler matching may be implemented by a digital mixer which carries out a sample by sample multiplication of the waveform by a sampled sinusoid. The read/write memory would be implemented in hardware and the multiplication can be done either in hardware or in software, depending on the application.

It will be appreciated that the first and second receiver modules are not limited to having the components shown in FIG. 2. For example, as an alternative to carrying out the downconversion in the analogue domain, the ADCs 5d, 6d may be placed directly after the LNAs 5b, 6b and the downconversion to baseband may be carried out in the digital domain, eliminating the need for analogue mixers 5c, 6c and the associated local oscillator. Moreover, as an alternative to carrying out the entire delay and Doppler matching in the second receiver module 6, the delay and Doppler matching could be split between the first and the second receiver modules so that both the reflected and the direct signal are adjusted or the delay and Doppler matching could be carried out solely on the reflected signal. For example, instead of the delay and frequency adjusters 6g in the second receiver module, delay and frequency adjusters could be provided in the digital pre-processor 5e of the first receiver module 5.

Figure 4:
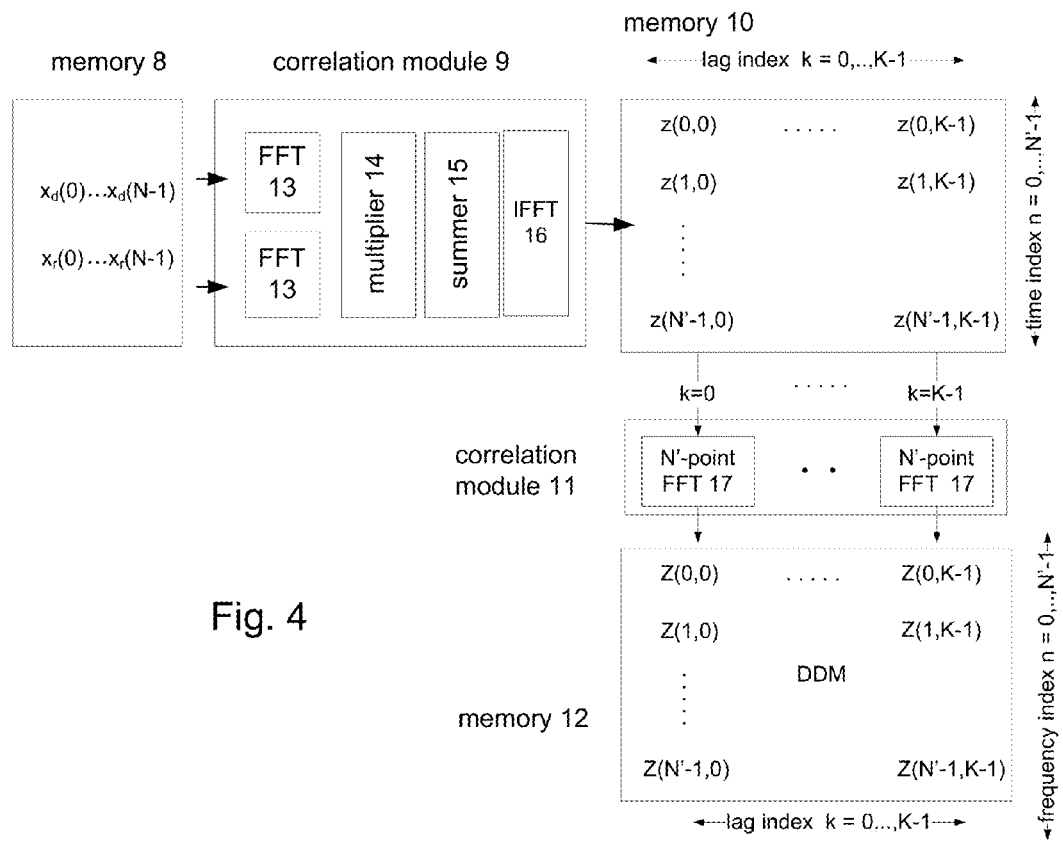
FIG. 4 schematically illustrates the components of a delay Doppler map processor.

With reference to FIG. 4, the DDM processor comprises a first memory 8, a first correlation module 9, a second memory 10, a second correlation module 11, and a third memory 12. As the samples of the reflected and the direct signal, in baseband complex envelope form, are received by the DDM processor 7 they are stored in the first memory 8. Each of the reflected and the direct signal is stored as a sequence of at least N samples. The first correlation module 9 then successively extracts different blocks of the sequences of samples stored in the first memory 8, corresponding to different subsequences of the sequence of samples, and generates a plurality of partial correlations for the set of K delays, using the blocks of samples, and stores these in the second memory 10. The partial correlations are obtained by obtaining discrete fourier transforms of sequences of samples formed from the extracted blocks of samples of the direct and the reflected signals, multiplying corresponding transforms and then transforming back to the lag domain. After the full set of samples has been processed, the second memory 10 comprises an array of partial correlations for each delay k. Each array is then fourier transformed in the second correlation module 11 to provide the correlations for the set of Doppler frequencies at each delay and these values are then stored in the third memory 12. The values stored in the third memory correspond to the Delay Doppler map since they provide the correlations for each specific Doppler frequency and delay. The DDM can be considered an array of complex numbers defined on the pixel grid formed by the lags along one axis and the Doppler frequencies along the other axis.

Each of the discrete fourier transforms (DFTs) can be carried out using fast fourier transform (FFT) algorithms according to some embodiments of the invention. The partial correlations in the first correlation module 9 are obtained using a 2K-point FFT segmented overlap algorithm as will be described in more detail below. Moreover, the correlations across the set of Doppler frequencies are computed using an N'-point FFT where N' is the number of partial correlations and which is much smaller than the number of samples N of the reflected and direct signal.

FIG. 4 is a conceptual diagram and it will be appreciated that three separate memory areas or devices may not be required. The memories 8, 10, 12 may be physically separate memories forming part of the same memory device or different memory devices or they may be the same volume of memory which is overwritten at each separate step of the process. For example, the arrays of partial correlations stored in the second memory 10 can be overwritten by the fourier transforms computed in the second correlation module 11 as long as the memory space used by the output of the second correlation module 11 is not required for further output of the first correlation module 9. In some implementations, the first memory 8 is not required and the samples are processed in the first correlation module 9 as they are received from the digital pre-processors 5e, 6e.

As shown in FIG. 4, the first correlation module 9 may comprise one or more FFT processor module 13, a multiplier module 14, a summation module 15 and an inverse FFT (IFFT) processor module 16. The second correlation module 11 may comprise one or more FFT processor modules 17. The one or more FFT processor modules 13 of the first and second correlation modules could, for example, be implemented as one dedicated FFT processor module 13 for processing the samples of the direct signal and one dedicated FFT processor module 13 for processing the samples of the reflected signal, as will be described in more detail below, or a single FFT processor module 13 could be used to process both the samples of the direct signal and the samples of the reflected signal. A separate FFT module 16 may be used to compute the inverse FFT. The one or more FFT processor modules 17 of the second correlation modules could, for example, be implemented as one dedicated FFT processor module 17 for each delay or for a number of delays, operating on different arrays in parallel, or all the FFTs could be computed serially using a single FFT processor module.

The first correlation module 9 and the second correlation module 11 can be implemented in either software or hardware or a combination of software and hardware. If the processing is carried out offline or if the processing is fast enough relative to the sampling rate, the processing could be timeshared. If the FFTs are implemented in software, the FFTs would be software threads executed by, for example, a general purpose computer. If the FFTs are implemented in hardware, they may for example be implemented as one or more Field Programmable Gate Arrays (FPGA) operating in series or in parallel as described above. The multiplier module 14 and the summer module 15 could also be implemented in an FPGA. Alternatively, as another example, they could be implemented as a set of software instructions executed by a general purpose computer. If one or both of the correlation modules 9, 11 are implemented as software, the sub-modules 13, 14, 15, 16, 17 of the or each, correlation module could all be implemented as functions of a central processing unit (CPU) of a general purpose computer or a dedicated processing device. The memory 8, 10, 12 could be memory buffers physically realised as hardware memory attached to the CPU or other FFT processors. The memory may be random access memory (RAM).

The functions of the first and the second correlation modules of the DDM processor will now be described in more detail. If the sequence of samples corresponding to the reflected signal is denoted $x_r(n)$ and the sequence of samples corresponding to the direct signal is denoted $x_d(n)$, where n is the index of the samples, it will be appreciated that the cross-correlation waveform that provides the correlation of the two signals for each delay k is given by the cross-correlation function:

$$w(k) = \sum_{n=0}^{N-1} x_r(n) x_d(n+k) = \sum_{n=0}^{N-1} z_k(n) \quad k = 0, \ldots, K-1 \qquad \text{Equation 1}$$

where N is the number of samples in each signal and K is the number of delays. In reality, each signal may have more than N samples but it is assumed that both sequences are zero outside the range (0, N−1).

As illustrated in FIGS. 5a and 5b, to determine the correlation between the two signals, the block of N direct signal samples $x_d(n)$ can effectively be slid across the block of N reflected signal samples $x_r(n)$, one sample at a time. At each position, the two blocks are multiplied sample by sample and the N point-wise products are summed to give one sample of the cross-correlation function.

According to the convolution theorem, a correlation can be obtained by taking the DFT of both sequences, multiplying and then taking the inverse DFT. Direct convolution requires N multiplications for each of N samples, i.e. $N^2$. As is known in the art, FFTs can be used to reduce the number of computations required. However, an FFT is not really possible to implement when N is very large, e.g. if N~100,000, as is typically the case in GNSS-R applications. A modified version of the FFT algorithm disclosed by C. Rader in "In An Improved Algorithm for High Speed Autocorrelation with Applications to Spectral Estimation" is used to compute a number of partial correlations for the set of delays in the present system.

As mentioned above, in addition to correlating the signals over the number of possible delays, a correlation across the Doppler frequencies is also desired. Shifting a signal by a frequency shift corresponding to a Doppler frequency $\omega_D$ can be represented as a multiplication of the signal by $e^{j\omega_D n}$ where $\omega_D$ is in radians/sample. The correlation waveform across N Doppler frequencies $\omega_D = 2\pi l/N$, for a specific delay, can be written as follows:

$$w(k, \omega_D) = \sum_{n=0}^{N-1} x_r(n) x_d(n+k) e^{j\omega_D(n+k)} = \quad \text{Equation 2}$$

$$e^{j\omega_D k} \sum_{n=0}^{N-1} z_k(n) e^{j\omega_D n} = e^{j\omega_D k} Z_k(l)$$

where $\exp(j\omega_D k)$ is a fixed, multiplicative phase factor for a given lag index k and $Z_k(l)$ is the N-point DFT evaluated at frequency $\omega_D = 2\pi l/N$. In principle, for a given lag index k, a complete set of N Doppler frequencies can be computed using an FFT to compute the DFT of Equation 2. However, in reality, as mentioned above, it is not really possible to implement an N-point FFT where N is very large. Additionally, only a small range of frequencies would be of interest because the Doppler bandwidth is much smaller than the bandwidth of signals $x_d$ and $x_r$, defined by the sampling rate $f_s$, and so most of the N points that would be obtained from the FFT would be discarded, making an N-point FFT inefficient even if it could be implemented.

As a solution to this problem, some prior art system reduce the bandwidth of the sequence $z_k(n)$ by filtering, using a comb filter, and decimation and then take an N'-point FFT to compute the Doppler frequencies where N'<<N, allowing the use of FFTs in one dimension, as will be described in more detail below. According to embodiments of the invention, a number of partial correlations are obtained instead using efficient FFTs and an N'-point FFT is then taken on the set of partial correlations. Accordingly, a direct computation of the correlations at each lag is replaced by the computation of a number of segmented correlations using FFTs. In other words, the invention allows FFTs to be used in both dimensions. The method according to the invention is significantly more efficient than the filtering and decimation process since FFTs can also be used in the lag domain.

Figure 6:
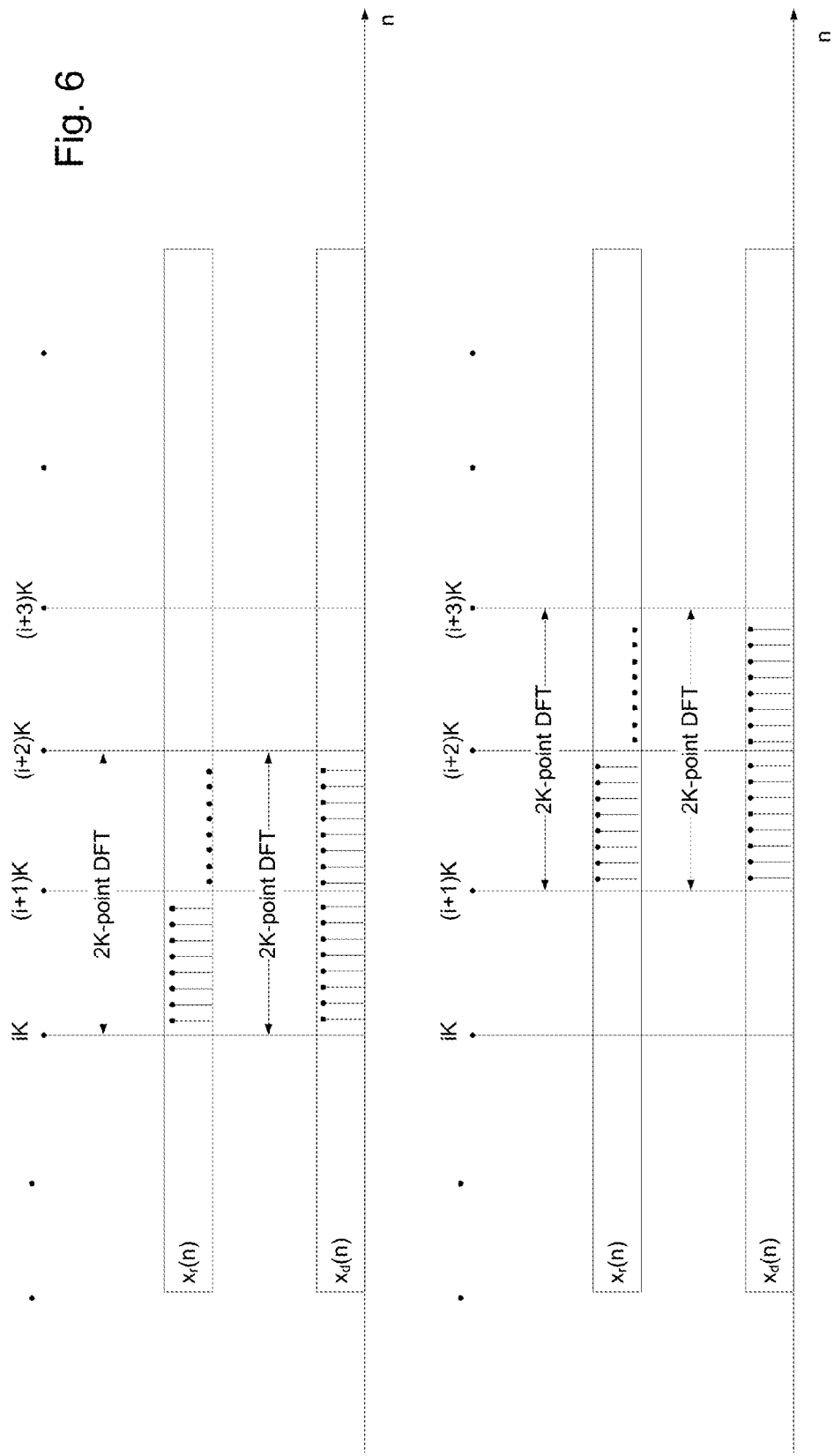
FIG. 6 illustrates how to form sequences of samples for computing partial correlations between the reflected signal and the reference signal.

The computation of the segmented correlations in the first correlation module 9 will now be described. With reference to FIG. 6, using the algorithm disclosed by Rader, we can see that each sequence $x_r(n)$ and $x_d(n)$ can be represented as a series of shorter 2K sample sequences:

$$x_r^i = \begin{cases} x_r(n+iK), & 0 \le n < K \\ 0 & K \le n \le 2K \end{cases} \quad i = 0, 1, 2, \ldots \quad \text{Equation 3}$$

$$x_d^i = x_d(n+iK), \ 0 \le n < 2K \quad i = 0, 1, 2, \ldots \quad \text{Equation 4}$$

The 2K-point DFTs of the 2K sample sequences can then be represented as $$X_d^i(k) = DFT\{x_d^i(n)\} \text{ and } X_r^i(k) = DFT\{x_r^i(n)\}$$

and it follows that $$W^i(k) = X_r^i(k) X_d^i(k) \text{ where } W^i(k) \text{ is the DFT of the sequence}$$

$$w^i(k) = \sum_{n=0}^{K-1} x_r(n+iK) x_d(n+iK+k), \quad k = 0, \ldots, K \quad \text{Equation 5}$$

It will be appreciated that the values of the sequence for k>K are not useful and are therefore not included in Equation 5.

It will further be recognised from Rader, that $$z^i(k) = \sum_{j=0}^{i} w^j(k) = \quad \text{Equation 6}$$

$$\sum_{j=0}^{i} \sum_{n=0}^{K-1} x_r(n+jK) x_d(n+jK+k) = \sum_{n=0}^{(i+1)K-1} x_r(n) x_d(n+k)$$

More importantly, it will be recognised that Equation 6 equals Equation 1, $w(k) = z^i(k)$, when $i = (N/K) - 1$ so that $(i+1)K - 1 = N - 1$. In other words, the full correlation for the set of different delays can be obtained for the N samples by obtaining a number of partial correlations $w^j(k)$ and then summing the partial correlations. More importantly, the full correlation can be obtained by the use of segmented and overlapping 2K-point FFTs even though the number of samples N in the sequences $x_r(n)$ and $x_d(n)$ may be very large.

It will be appreciated that although it has been described that the full correlation can be obtained by the use of 2K-point FFTs on sequences formed according to Equations 3 and 4, the calculation of the full correlation is not limited to being based on FFTs of sequences as defined in Equation 3 and 4. For example, instead of forming the first sequence from the reflected signal by using the samples of a block of K samples from the reflected signal and extending it by K zeros and forming a second sequence based on the direct signal by taking 2K samples from the direct signal, the first sequence may be formed by taking 2K samples from the reflected signal and the second sequence may be formed by taking K samples from the direct signal and setting the next K samples to zero. In other words, the sequences may alternatively be formed as shown in Equations 7 and 8 below.

$$x_r^i = x_r(n+iK), \ 0 \le n < 2K \quad i = 0, 1, 2, \ldots \quad \text{Equation 7}$$

-continued $$x_d^j = \begin{cases} x_d(n+iK), & 0 \le n < K \\ 0 & K \le n \le 2K \end{cases} \quad i = 0, 1, 2, \ldots \qquad \text{Equation 8}$$

It will also be recognised that the summation of the partial correlations to form a full correlation could be carried out in the transform domain before conversion back to the lag domain. In fact, Rader discloses that all the partial correlations, for the whole N samples, are summed in the transform domain before conversion back to the lag domain. In contrast, according to the invention, an IFFT is taken more often, in the inverse FFT module 16, and a number N' of partial correlations z (n', k) are transformed back into the lag domain and the Doppler correlation is then carried out on the array of partial correlations.

In more detail, with reference to FIG. 4 again, the first correlation module 9 calculates a number N' of partial correlation values z(n', k) for each lag k by dividing each of the sequences of N samples into contiguous blocks or sub-sequences of length K, each sub-sequence of the reflected signal having an associated sub-sequence of the direct signal, and for each sub-sequence of the reflected or direct signal forming a sequence of the K samples extended by K zeros, as defined in Equation 3 or 8, and forming a corresponding sequence of the other of the reflected or direct signal comprising the K samples of the associated sub-sequence and the K samples of the next sub-sequence, as defined in Equations 4 or 7, computing 2K-point FFTs of the sequences, $x_r^j(n)$ and $x_d^j(n)$, in the one or more FFT modules 13 of the first correlation module and multiplying the FFTs of the sequences $x_r^j(n)$ and $x_d^j(n)$ in multiplier 14, repeating the computation of transforms and the multiplication of the transforms for adjacent sub-sequences of samples to form m products and summing the m products in summer 15 before converting the result back into the lag domain, using a 2K-point FFT, in IFFT module 16.

As mentioned above, a single FFT processor can be used which computes all the FFTs for all the sequences formed according to Equations 3 and 4 or Equations 7 and 8 in series. Alternatively, a separate FFT processor can be used for the sequences based on the reflected signal and formed according to Equation 3 or 7 and a separate FFT processor can be used for the sequences based on the direct signal and formed according to Equation 4 or 8.

The K useful samples z(n', k) are written to a row in a matrix in the second memory 10. In other words, the inverse FFT module 16 only provides the first K samples of the transform to the memory 10. The K useful samples correspond to one partial correlation for each of the K delays. The other samples are discarded. The calculation is repeated for each mK samples, where N'=N/mK, to form a new set of K partial correlation values, which are written to successive rows in the matrix in the second memory. Each column of the matrix would include the partial correlations for a specific delay k. When all the N' partial correlations have been obtained, an N'-point FFT is calculated for each lag k in the FFT modules 17 of the second correlation module 11. In other words, an N' point FFT is obtained for each column comprising values z(0, k), z(1,k), z(2,k) . . . z(N'−1,k) in FIG. 4 to convert each array of values into the frequency domain and therefore provide the correlation values for the set of N' Doppler frequencies for each lag.

The transform carried out by each FFT module 17 of the second correlation module 11 can be written as $$Z(l, k) = \sum_{n'=0}^{N'-1} z(n', k) e^{j\omega_D n'} \quad \text{where } \omega_D = 2\pi l/N'. \qquad \text{Equation 9}$$

It will be realised that if m=2, N=100,000 and K=500, N' would be 100. In some embodiments m>2 to reduce N' further. However, m equal to or higher than 2 would typically provide a value of N' that is small enough for the Doppler frequencies for each delay to be computed using an FFT.

The transform provided by each FFT module 17 of the second correlation module 11 is written into the third memory 12 as a separate column. The values of the columns of the third memory 12 together make up a matrix which is the DDM computed at the required set of N' frequencies and K lags.

The process for obtaining the DDM in the DDM processor 7 of FIG. 4 is also shown conceptually in FIG. 7. As shown, a number of partial correlations is calculated for each delay using 2K-point FFTs and an N'-point FFT is then obtained for each delay. By decimating the signal for providing the correlation samples for each delay by summing the products of a number of 2K transforms and thereby effectively averaging over a number of samples, the correlation to find the Doppler spread can also be carried out using an FFT.

The processing in the DDM processor 7 described herein of obtaining 2K-point FFTs, multiplying corresponding FFTs and summing the products of the 2K-point FFT after we have processed mK samples, has the same mathematical effect as if we formed the sequence $z_k(n)$ of Equation 1, for each value of k, and then passed this sequence through a comb filter with output decimation by mK, to give a resulting set of N'=N/mK samples for each lag index k, according to the prior art approach shown in FIG. 8. However, the processing in the DDM processor 7 described herein is more efficient as K increases since the processing allows the use of FFTs in the lag domain as well as the Doppler domain.

In more detail, to compute each of the K correlation lag sequences directly and then performing the comb filtering and decimation followed by the N'-point FFTs to compute the N' Doppler frequencies for each time lag index, as shown in FIG. 8, the number of multiplications per second (MPS) required can be written as follows:

$$MPS = K \cdot f_s + K \cdot FFT_{N'} \frac{f_s}{N} = \left( K + K \cdot \frac{N' \log_2(N')}{mKN'} \right) f_s \approx K \cdot f_s \qquad \text{Equation 10}$$

where $FFT_{N'}$ is the number of multiplications to compute an N'-point FFT and may, using the radix-2 Cooley Tukey algorithm as an example, be given by $N' \log_2(N')$. The dominant term is $K \cdot f_s$, resulting from the multiplication of two complex numbers for each lag at the full input sampling rate $f_s$.

In contrast, to compute K partial correlations using and then N' Doppler lags using FFTs, as shown in FIG. 7, the MPS can be written as follows:

$$MPS = \qquad \text{Equation 11}$$

-continued $$(FFT_{2K} + FFT_{2K} + 2K)\frac{f_s}{K} + IFFT_{2K}\frac{f_s}{mK} + K \cdot FFT_{N'}\frac{f_s}{N} \approx$$

$$2(3 + 2\log_2(K))f_s$$

where $FFT_{2K}$ is the number of multiplications to compute an 2K-point FFT and may, using the radix-2 Cooley Tukey algorithm as an example again, be given by $2K \log_2(2K)$. The N'-point FFTs to compute the Doppler frequencies are the same as in the process illustrated with respect to FIG. 8, as expected. Considering Equations 10 and 11, it will be appreciated that for K>16, the MPS for the approach according to the invention is lower than the MPS for the prior art approach illustrated with respect to FIG. 8 and the computational saving increases as K increases.

It will be appreciated that in the prior art approach of FIG. 8, using a comb filter and decimation, each branch produces an output sequence of N' samples which would form a column in the matrix in memory 10. In the DDM processor 7 described herein, each iteration of the calculations in the first correlation module 9 for providing a number of partial correlations produces a row in memory 10 instead.

It will be realised that a number of different FFT algorithms can be used to implement the 2K-point transforms and the N'-point transforms and specific FFT algorithms will not be described in detail herein. One example of an FFT algorithm that could be used is the Good-Thomas prime factor algorithm but it will be appreciated that the selection of a suitable FFT algorithm depends on the desired transform size and the target hardware. For example, if a processor does additions more cheaply than multiplication then a transform that minimises the number of multiplications at the expense of more additions may be suitable. A description of different FFTs and the computation costs for all transform sizes from 1 to 1000 can be found on page 137 of Multiplicative Complexity, Convolution and the DFT by M. T. Heideman, Springer 1988.

Figure 9:
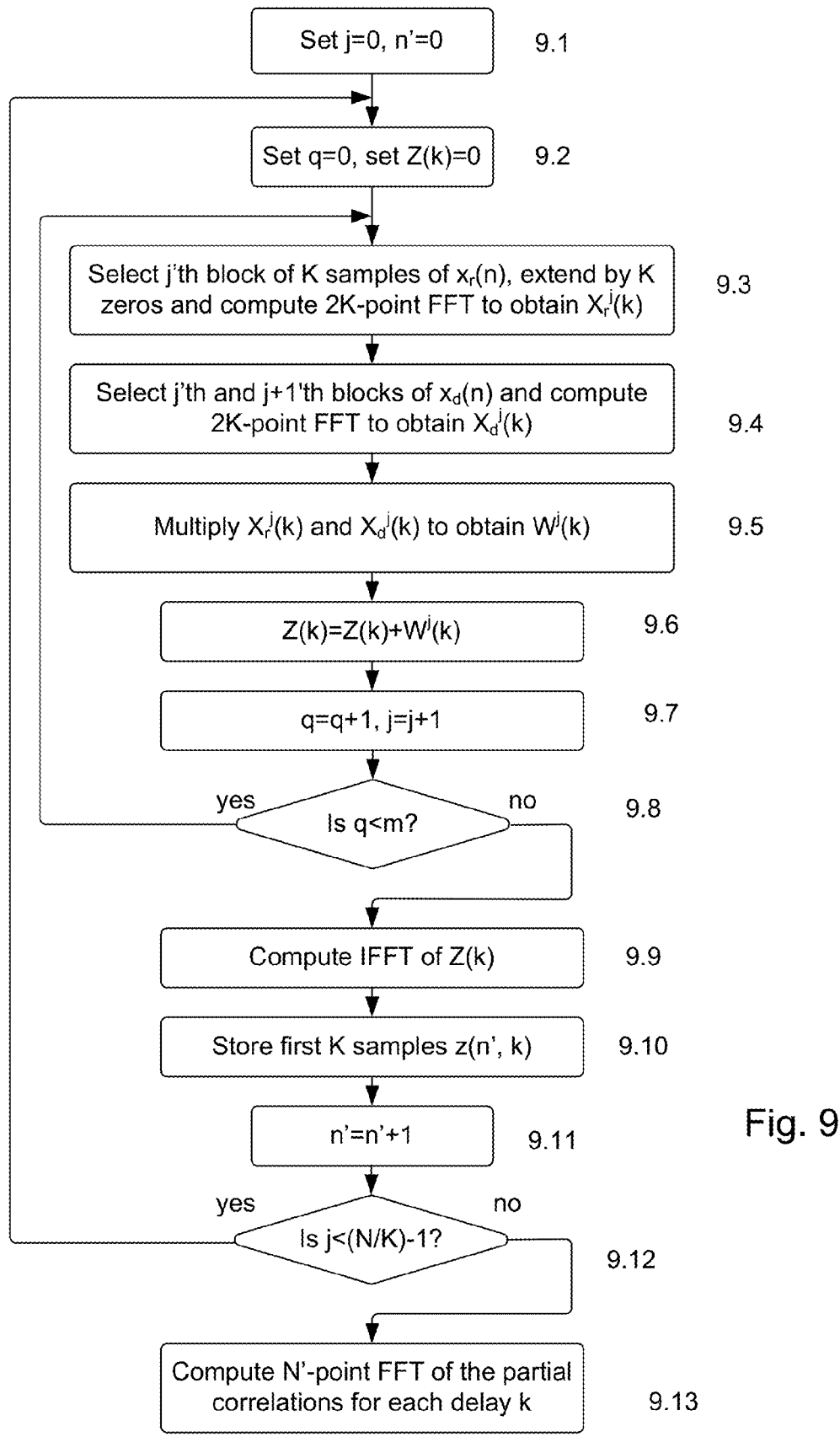
FIG. 9 illustrates a process for obtaining the delay Doppler map for a reflected signal according to embodiments of the invention.

A process for obtaining the delay Doppler map in the DDM processor 7 will now be described with respect to FIG. 9. The process involves a number of steps which may be defined by a set of instructions of one or more computer programs. The process can then be carried out when the instructions are executed in a processing arrangement. The processing arrangement may include one or more FPGAs. Some of the steps could be implemented by an FPGA. For example, steps 9.3, 9.4, 9.5, 9.6, 9.9 and 9.13 would be good candidates for the FPGA since they involve arithmetic. The other steps could also be implemented in the FPGA or could be implemented in software on a co-processor.

The process starts at steps 9.1 where the integer parameters j and n' are set to zero. The parameter j is a parameter identifying a different block or subsequence of K samples of the reflected signal and its corresponding block or subsequence of K samples of the direct signal as illustrated in FIG. 6. There are a total of N/K subsequences in each of the reflected and the direct sequence of samples. The parameter n' is a parameter identifying a specific partial correlation for each delay k where the total number of partial correlations are N'. At step 9.2, an integer parameter q and the values in an array Z(k) which may be stored by the first correlation module 9 are set to zero. The parameter q is used to count the number of iterations of FFTs to be obtained before an inverse FFT is computed to provide a partial correlation. The parameter q is repeated until it reaches m, where m=(N/K)/N'. As mentioned, m can be equal to 1 but typically m≤2.

The array Z(k) holds the sums of a number of multiplied transforms as will be described in more detail below.

At step 9.3, the 0'th block of K samples of the reflected signal is chosen and a first sequence $x_r^0(n)$ is formed by extending the K samples by K zeros, according to Equation 3, and an FFT is then obtained. At step 9.4, the 0'th block and the 1'st block of the sequence of samples of the direct signal are then used to form a second sequence $x_d^0(n)$, according to Equation 4, and an FFT is also computed for the second sequence. As explained above, a sequence based on the reflected signal can alternatively be formed by choosing the samples of the 0'th and the 1'st block of subsequences as defined by Equation 7 and the sequence based on the direct signal can be formed by choosing the samples of the 0'th block extended by K zeros as defined by Equation 8. At step S9.5, the transforms are multiplied together and the result is added to the array Z(k) at step S9.6. In the multiplication of the transforms, each sample of one of the sequences is multiplied with the corresponding sample of the other sequence, i.e. $x_r^j(0)$ multiplies $x_d^j(0)$ and $x_r^j(1)$ multiplies $x_d^j(1)$, etc. The parameters q and j are then both incremented by 1 at step 9.7 and it is then determined at step 9.8 if the parameter q is smaller than the value of parameter m. If q<m, steps 9.3 to 9.8 are repeated.

In the second iteration of steps 9.3 to 9.8, a first sequence $x_r^1(n)$ is formed by selecting the $1^{st}$ subsequence of samples of the reflected signal and extending it by K zeros and a second sequence $x_d^1(n)$ is formed by selecting the $1^{st}$ and the $2^{nd}$ subsequences of signals from the direct signals and the sequences are then transformed and multiplied. It will of course be appreciated that the sequences can also be formed according to Equations 7 and 8. The product sequence is then added to the values already in the array Z(k) at step S9.6. Parameters q and j are then incremented again and it is checked whether the parameter q has now reached the value of m.

If q=m, an inverse FFT is computed from the values in the array Z(k) at step S9.9 to provide a first set of partial correlations for the K delays. The first set of partial correlations is stored in memory 12 at step 9.10 and the parameter n' is then incremented by 1 to indicate that a first set of partial correlation has been formed.

It is then checked at step 9.12 whether all subsequences of samples of the direct and reflected sequences have been processed. In more detail, each sequence would have N/K blocks and if the value of j is smaller than N/K−1, a new partial correlation calculation is carried out by repeating steps 9.2 to 9.11. The array Z(k) is emptied and q is set to zero at step 9.2 and the process starts again but for the next subsequences of samples of the direct and reflected signals.

Although it has been described above that steps 9.3 to 9.7 are iterated m times, and the FFTs of the sequences based on different blocks of samples of the reflected and direct signal are successively computed, it is contemplated that the m calculations may be carried out in parallel. In other words, the first correlation module may extract the relevant subsequences and form more than one sequence based on the reflected signal samples and more than one sequence based on the direct signal samples at the start of the partial correlation calculation and then carry out some of the FFTs in parallel using a plurality of FFT modules, before corresponding transforms are multiplied and all the point-wise products are summed and the inverse FFT is formed. For example, the first correlation module may compute all the FFTs for a partial correlation calculation at the start. At least some of the FFTs may be carried out in parallel.

When all samples have been processed and a plurality of partial correlations have been obtained, the process continues to step 9.13 and an N'-point FFT for the partial correlations for each delay is computed to provide the set of Doppler frequency correlations for that delay. The N'-point FFTs may be carried out in parallel or in series and when all the FFTs are completed, a matrix of values providing the delay Doppler map are obtained.

Whilst specific examples of the invention have been described, the scope of the invention is defined by the appended claims and not limited to the examples. The invention could therefore be implemented in other ways, as would be appreciated by those skilled in the art.

It will be appreciated that although it has been described that to provide the partial correlations 2K FFTs are computed for specific sequences formed according to Equations 3 and 4 or Equations 7 and 8, the sequences for forming the partial correlations may be formed in alternative ways.

It will be realised that although the delay correlation has been described to be implemented by a number of 2K-point FFTs to find the correlation across K delay lags, it would also be possible to use larger FFTs, e.g. 3K or 4K FFTs. The DDM processor would still only save the first K samples.

Although the invention has been described with respect to a GNSS-R system, it will be appreciated that the invention can be used in any system in which a delay Doppler map is required to be computed for a received signal. The invention may for example be used in delay Doppler radar imaging or in medical ultrasound imaging.

Moreover, although it has been described that a number of multiplied transforms are summed before an inverse transform is computed, it will be appreciated that the summation could take place in the time domain and an inverse transform can be obtained after each multiplication.

Additionally, although the invention allows the DFTs to be carried out using FFTs algorithms in the both dimensions, it will be appreciated that the invention is not limited to the use of FFTs in both dimensions.

The invention claimed is:

1. A method of processing a reflected signal R having a delay and a frequency shift relative to a reference signal D to obtain a delay Doppler map, the method comprising:
   a signal receiver receiving a sequence of samples $x_r(n)$ corresponding to the reflected signal R transmitted from a satellite and reflected to the signal receiver by a target area, and the signal receiver receiving a sequence of samples $x_d(n)$ corresponding to said reference signal D;
   a signal processor obtaining a plurality of partial correlations $z(n', k)$ between the sequence of samples $x_r(n)$ corresponding to the reflected signal and the sequence of samples $x_d(n)$ corresponding to the reference signal received by the signal receiver, across a set of delays, to provide a set of partial correlation samples for each delay, each partial correlation sample of a set corresponding to a different partial correlation for that delay, wherein obtaining a number of partial correlations of said plurality of partial correlations, providing one partial correlation sample for each delay, comprises:
   obtaining discrete fourier transforms (DFTs) of at least a first and an associated second sequence of samples, the first sequence including at least one subsequence of the reflected signal and the second sequence comprising at least one associated subsequence of the reference signal, and obtaining an inverse DFT of a sequence of samples derived from at least a product of said DFTs of the first and second sequences;
   the signal processor obtaining a DFT for each set of partial correlation samples to determine a correlation between sequences of samples across a plurality of frequency shifts at each delay of the set of delays; and
   the signal processor outputting the delay Doppler map representing the energy received from the target area, which reflects the reflected signal R, transmitted from the satellite, to the signal receiver, as a function of delay and Doppler shift, using the determined correlation between the sequences of samples.

2. A method according to claim 1, wherein each set of partial correlation samples includes a number N' of partial correlation samples, and wherein obtaining the DFT of each set comprises:
   computing an N'-point fast fourier transform FFT.

3. A method according to claim 2, wherein the set of delays includes K delays and each of the first and second sequences includes 2K samples, and wherein obtaining the DFTs of the first and second sequences comprises:
   computing 2K-point FFTs and obtaining the inverse DFT comprises computing a 2K-point inverse DFT.

4. A method according to claim 3, wherein obtaining a number of partial correlations providing one partial correlation sample for each delay comprises:
   multiplying each sample of the DFT of the first sequence with a corresponding sample of the DFT of the second sequence to form a product of the DFTs, wherein obtaining the inverse DFT of a sequence of samples derived from at least a product of said DFTs comprises:
   obtaining the inverse DFT directly on said product of the DFTs.

5. A method according to claim 3, wherein obtaining the number of partial correlations providing one partial correlation sample for each delay comprises:
   obtaining DFTs of each of a plurality of first sequences of samples, comprising said first sequence of samples, to provide a plurality of first transformed sequences, each of the plurality of first sequences of samples comprising samples of at least one respective subsequence of the reflected signal; and
   obtaining DFTs of each of a plurality of second sequences of samples, comprising said second sequence of samples, to obtain a plurality of second transformed sequences, each of the plurality of second sequences of samples comprising samples of at least one respective associated subsequence of the reference signal;
   multiplying each sample of each of the first transformed sequences with a corresponding sample of an associated second transformed sequence to provide a plurality of transformed product sequences; and
   summing the transformed product sequences to provide a summed product sequence, wherein obtaining the inverse DFT of a sequence of samples derived from at least a product of said DFTs of the first and second sequences comprises:
   obtaining the inverse DFT of the summed product sequence.

6. A method according to claim 1, wherein the set of delays includes K delays and each of the first and second sequences includes 2K samples, and wherein obtaining the DFTs of the first and second sequences comprises:
   computing 2K-point FFTs and obtaining the inverse DFT comprises computing a 2K-point inverse DFT.

7. A method according to claim 1, wherein obtaining the number of partial correlations providing one partial correlation sample for each delay comprises:

multiplying each sample of the DFT of the first sequence with a corresponding sample of the DFT of the second sequence to form a product of the DFTs, wherein obtaining the inverse DFT of a sequence of samples derived from at least a product of said DFTs comprises: obtaining the inverse DFT directly on said product of the DFTs.

8. A method according to claim 1, wherein obtaining the number of partial correlations providing one partial correlation sample for each delay comprises:
  obtaining DFTs of each of a plurality of first sequences of samples, comprising said first sequence of samples, to provide a plurality of first transformed sequences, each of the plurality of first sequences of samples comprising samples of at least one respective subsequence of the reflected signal; and
  obtaining DFTs of each of a plurality of second sequences of samples, comprising said second sequence of samples, to obtain a plurality of second transformed sequences, each of the plurality of second sequences of samples comprising samples of at least one respective associated subsequence of the reference signal;
  multiplying each sample of each of the first transformed sequences with a corresponding sample of an associated second transformed sequence to provide a plurality of transformed product sequences; and
  summing the transformed product sequences to provide a summed product sequence, wherein obtaining the inverse DFT of a sequence of samples derived from at least a product of said DFTs of the first and second sequences comprises:
  obtaining the inverse DFT of the summed product sequence.

9. A method according to claim 8, wherein the plurality of first sequences includes at least two first sequences, and the plurality of second sequences includes at least two second sequences.

10. A method according to claim 1, comprising:
  forming said at least one subsequence of the reflected signal and said at least one subsequence of the reference signal form part of a plurality of subsequences of K samples of the reflected signal and the reference signal respectively, wherein each partial correlation for a specific delay corresponds to a contiguous segment of the reflected signal, comprising one or more of the plurality of subsequences, and an associated contiguous segment of the reference signal, comprising one or more associated subsequences of the plurality of subsequences of the reference signal; and
  wherein a subsequence of the plurality of subsequences of the sequence of samples corresponding to the reflected signal $x_r(n)$ comprises samples $x_r(n+iK)$, and a subsequence of the plurality of subsequences of the sequences of samples corresponding to the reference signal $x_d(n)$ comprises samples $x_d(n+iK)$, where $0 \le n < K$ and $i = 0, 1, 2 \ldots$.

11. A method according to claim 10, comprising:
  forming each of the first sequences of samples $x_r^i$ and each of the second sequences of samples $x_d^i$ by equations:

$$x_r^i = \begin{cases} x_r(n+iK), & 0 \le n < K \\ 0 & K \le n \le 2K \end{cases} \quad i = 0, 1, 2, \ldots \text{ and}$$

$$x_d^i = x_d(n+iK), \quad 0 \le n < 2K \quad i = 0, 1, 2, \ldots \text{ respectively,}$$

or formed by equations $$x_r^i = x_r(n+iK), \quad 0 \le n < 2K \quad i = 0, 1, 2, \ldots \text{ and}$$

$$x_d^i = \begin{cases} x_d(n+iK), & 0 \le n < K \\ 0 & K \le n \le 2K \end{cases} \quad i = 0, 1, 2, \ldots \text{ respectively,}$$

wherein a value of i for a first sequence is as same as a value of i for an associated second sequence.

12. A computer program comprising instructions, stored in a non-transitory medium, that when executed by a processor arrangement, cause the processor arrangement to carry out the method of claim 1.

13. Apparatus for processing a sequence of samples of a reflected signal R reflected by a target surface and having a delay and a frequency shift relative to a reference signal D to obtain a delay Doppler map for the reflected signal, the apparatus comprising:
  a signal receiver for receiving a sequence of samples $x_r(n)$ corresponding to a reflected signal R transmitted from a satellite and reflected to the signal receiver by a target area, and a sequence of samples $x_d(n)$ corresponding to the reference signal D;
  a first correlation module for obtaining a plurality of partial correlations $z(n', k)$ between the sequence of samples $x_r(n)$ corresponding to the reflected signal R transmitted from the satellite and reflected by the target area, and the sequence of samples $x_d(n)$ corresponding to the reference signal D, across a set of delays, the first correlation module being configured to obtain a number of partial correlations $z(n', k)$ of said plurality of partial correlations, providing one partial correlation sample for each delay, by obtaining a discrete fourier transform (DFT) of at least a first sequence of samples and a DFT of at least a second sequence of samples, the first sequence including at least one subsequence of samples of the reflected signal R and the second sequence including at least one associated subsequence of samples of the reference signal D, and to obtain an inverse DFT of a sequence of samples derived from at least said DFTs of the first and second sequences;
  a memory for storing a plurality of sets of partial correlation samples, the samples of each set corresponding to the partial correlations for a different delay; and
  a second correlation module for obtaining a DFT of the samples in each set to determine the correlation between the sequences of samples of the reflected and the reference signals across a plurality of frequency shifts at each delay of the set of delays, and
  the second correlation module outputs the delay Doppler map representing the energy received from the target area, which reflects the reflected signal R, transmitted from the satellite, as a function of delay and Doppler shift, using the determined correlation between the sequences of samples.

14. Apparatus method according to claim 13, wherein the first correlation module is configured to obtain N' partial correlations for each delay, and wherein the second correlation module is configured to use an N'-point FFT algorithm to obtain the DFT of the samples in each set, and wherein the set of delays comprise K delays, each of the first and the second sequences comprises 2K samples, and the first correlation module is configured to use a 2K-point FFT algorithm to compute the DFTs of the first and the second sequences.

15. Apparatus according to claim 14, wherein the first correlation module comprises:
one or more FFT modules for successively computing 2K-point FFTs of each of a plurality of first sequences of samples, including said first sequence of samples, to provide a plurality of first transformed sequences, and each of a plurality of second sequences of samples, including said second sequence of samples, to provide a plurality of second transformed sequences, each of the plurality of first sequences of samples including the samples of at least one respective subsequence of the reflected signal, and each of the plurality of second sequences of samples including the samples of at least one respective associated subsequence of the reference signal;
a multiplier for multiplying each of the first transformed sequences with an associated second transformed sequence to provide a plurality of transformed product sequences;
a summer for summing the transformed product sequences to derive a sequence of samples from at least said DFTs of the first and second sequences; and
an inverse FFT module for computing a 2K-point inverse FFT of the derived sequence to obtain said number of partial correlations.

16. Apparatus according to claim 15, wherein the first correlation module is configured to form each of the first sequences of samples $x_r^i$ and each of the second sequences of samples $x_d^i$ according to equations:

$$x_r^i = \begin{cases} x_r(n+iK), & 0 \leq n < K \\ 0 & K \leq n \leq 2K \end{cases} \quad i = 0, 1, 2, \ldots \text{ and}$$

$$x_d^i = x_d(n+iK), 0 \leq n < 2K \quad i = 0, 1, 2, \ldots \text{ respectively,}$$

or according to equations $$x_r^i = x_r(n+iK), 0 \leq n < 2K \quad i = 0, 1, 2, \ldots \text{ and}$$

$$x_d^i = \begin{cases} x_d(n+iK), & 0 \leq n < K \\ 0 & K \leq n \leq 2K \end{cases} \quad i = 0, 1, 2, \ldots \text{ respectively,}$$

wherein a value of i for a first sequence is as same as a value of i for an associated second sequence.

17. Apparatus according to claim 16, comprising:
an analogue to digital converter for digitising the reflected signal to form a sequence of samples corresponding to the reflected signal.

18. A reflectometry satellite comprising:
a satellite housing; and
the apparatus for processing samples of claim 13.

19. Apparatus according to claim 13, wherein the first correlation module comprises:
one or more FFT modules for successively computing 2K-point FFTs of each of a plurality of first sequences of samples, including said first sequence of samples, to provide a plurality of first transformed sequences, and each of a plurality of second sequences of samples, including said second sequence of samples, to provide a plurality of second transformed sequences, each of the plurality of first sequences of samples including the samples of at least one respective subsequence of the reflected signal, and each of the plurality of second sequences of samples including the samples of at least one respective associated subsequence of the reference signal;
a multiplier for multiplying each of the first transformed sequences with an associated second transformed sequence to provide a plurality of transformed product sequences;
a summer for summing the transformed product sequences to derive a sequence of samples from at least said DFTs of the first and second sequences; and
an inverse FFT module for computing a 2K-point inverse FFT of the derived sequence to obtain said number of partial correlations.

20. Apparatus according to claim 13, comprising:
an analogue to digital converter for digitising the reflected signal to form a sequence of samples corresponding to the reflected signal.

* * * * *